No. 820,296. PATENTED MAY 8, 1906.
V. GALLIEN.
METHOD OF MAKING ARMORED TIRES.
APPLICATION FILED JAN. 26, 1903.

UNITED STATES PATENT OFFICE.

VALERY GALLIEN, OF PARIS, FRANCE, ASSIGNOR TO SOCIÉTÉ-ANONYME DES PNEUMATIQUES CUIR "SAMSON," OF PARIS, FRANCE.

METHOD OF MAKING ARMORED TIRES.

No. 820,296. Specification of Letters Patent. Patented May 8, 1906.

Application filed January 26, 1903. Serial No. 140,624.

*To all whom it may concern:*

Be it known that I, VALERY GALLIEN, manufacturer, a citizen of the Republic of France, and a resident of 10 Boulevard Emile-Angier, Paris, France, have invented certain new and useful Improvements in the Method of Making Armored Tires; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to the manufacture of pneumatic tires for cycles, motor-vehicles, and the like, consisting of a rubber base having a cover or tread, preferably of leather, armored or unarmored, secured thereto, and has for its object the method of securing such protecting-band to the rubber base so that it will be firmly united thereto.

Figure 1:
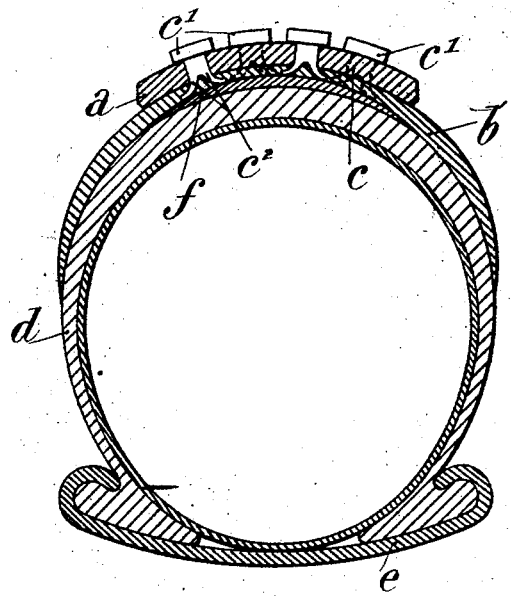
Figure 2:
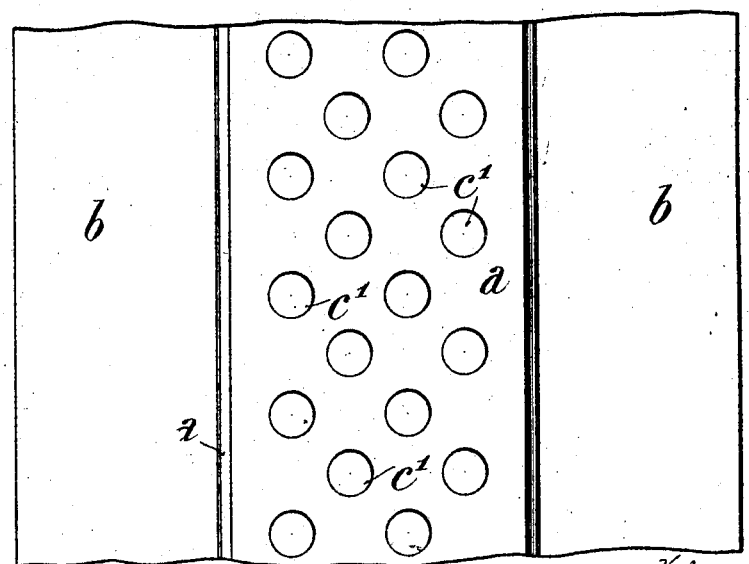

Referring to the drawings, in which like parts are similarly designated, Figure 1 is a cross-section of my improved tire, and Fig. 2 is a plan of part of a tire developed or flattened out.

I take a rubber tire $d$, such as is now made, whether it be of pure rubber or not, and preferably well scrape or fur the outer surface with a rasp or otherwise and then coat the furred portion of the surface with a solution of rubber, applying one or more coats, if necessary. A strip of leather $f$, preferably chrome-tanned leather, is cleaned of grease by a suitable solvent, such as benzene. The edges, skived thin or beveled, are also covered with one or more coats of rubber solution, the leather being preferably roughened on its surface. I use chrome-tanned leather because I have found it to be the only kind of leather that will hold well when vulcanized to the rubber and that will stand the skidding when rounding curves. I then apply to the contact-surfaces of the coated leather and tire after they are dry and by means of a brush a liquid composed of carbon bisulfid, about ninety-eight per cent., and protochlorid of sulfur, about two per cent. I then press the surfaces to be united tightly together, thereby obtaining a vulcanization in the cold that causes the parts to adhere firmly together. This strip of leather or other substance $f$ protects the underneath rubber tire $d$ from being chafed or worn by the inner ends of the armor-rivets $c$. I then form the armor-band proper, which consists, preferably, of a strip of chrome-tanned leather $b$, having thinned or skived edges that reach down the sides of the tire, and rivet it to another strip of leather $a$, that is directly on the tread of the wheel.

I preferably use rivets having a head $c'$ and a shank that is split preferably by running a milling-tool through the shank to form two portions $c^2$, that are passed through both of the pieces $a$ and $b$ and then bent over or clenched on the under side of the piece $b$. The under side (preferably the flesh side) of the piece $b$ is then cleaned from grease and furred or roughened and coated with rubber solution.

The protecting-strip $f$ is similarly prepared or coated with rubber solution and when dry brushed over with the mixture of sulfur compounds above set forth and the parts are pressed together, this method producing a cold vulcanization of the parts.

The general use of such tires on automobiles has demonstrated that the uniting of the leather and rubber is all that is to be desired and that they wear exceptionally well and the chrome-tanned leather is peculiarly well adapted to vulcanization in the cold.

Having thus described my invention, what I claim as new therein, and desire to secure by Letters Patent, is—

1. The method of making armored tires which consists in cold-vulcanizing the flesh side of chrome-tanned leather to rubber tires, substantially as set forth.

2. The method of making armored tires which consists in cold-vulcanizing the flesh side of chrome-tanned leather to rubber tires under pressure, substantially as set forth.

3. The method of making armored tires, which consists in furring or roughening the surface of the rubber tire, similarly preparing both sides of a chafing-strip, coating the prepared surfaces with rubber solution, applying to the coated proximate surfaces a mixture of carbon bisulfid and protochlorid of sulfur, uniting the parts under pressure, uniting a chrome-tanned leather tread to the hair side of a strip of similar leather wider than the chafing-strip, studding the united tread and strip with armor-rivets, roughening the flesh side of the latter strip, coating it, the chafing-strip and part of the tire beyond the chafing-strip with rubber solution, and then with the aforesaid protochlorid of sulfur and carbon bisulfid and uniting the parts by pressure.

In testimony that I claim the foregoing as my invention I have signed my name in presence of two subscribing witnesses.

VALERY GALLIEN.

Witnesses:
AUGUSTUS E. INGRAM,
HENRY THIESSE.